(12) United States Patent
Knight et al.

(10) Patent No.: US 10,226,727 B2
(45) Date of Patent: Mar. 12, 2019

(54) FILTER ASSEMBLY WITH CAM-LOCK FILTER INTERFACE

(71) Applicant: Cummins Filtration IP, Inc., Columbus, IN (US)

(72) Inventors: Jessie A. Knight, Oregon, WI (US); Scott G. Manke, Sun Prairie, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 100 days.

(21) Appl. No.: 15/314,313

(22) PCT Filed: Jun. 1, 2015

(86) PCT No.: PCT/US2015/033500
§ 371 (c)(1),
(2) Date: Nov. 28, 2016

(87) PCT Pub. No.: WO2015/187538
PCT Pub. Date: Dec. 10, 2015

(65) Prior Publication Data
US 2017/0095761 A1     Apr. 6, 2017

Related U.S. Application Data

(60) Provisional application No. 62/007,283, filed on Jun. 3, 2014.

(51) Int. Cl.
*B01D 46/00* (2006.01)
*B01D 46/12* (2006.01)
(Continued)

(52) U.S. Cl.
CPC ..... *B01D 46/0005* (2013.01); *B01D 46/0004* (2013.01); *B01D 46/0024* (2013.01);
(Continued)

(58) Field of Classification Search
CPC ................ B01D 46/001; B01D 46/002; B01D 46/0023; B01D 46/10; B01D 46/0005; B01D 46/4227
(Continued)

(56) References Cited

U.S. PATENT DOCUMENTS 3,759,017 A  9/1973 Young
4,023,944 A  5/1977 Beane
(Continued)

FOREIGN PATENT DOCUMENTS

CN  1767885 A  5/2006
CN  102397730 A  4/2012
EP  1 980 307 A1  10/2008

OTHER PUBLICATIONS

First Office Action issued for Chinese Patent Application No. 201580026623.9, dated Apr. 19, 2018, including English language translation, 16 pages.
(Continued)

*Primary Examiner* — Duane Smith
*Assistant Examiner* — Minh Chau T Pham
(74) *Attorney, Agent, or Firm* — Foley & Lardner LLP

(57) ABSTRACT

A filter assembly may include a housing and a cover movably connected to the housing and movable between an open position and a closed position. The filter assembly may also include at least one projection extending from the cover towards an interior of the housing and a filter element that fits at least partially within the housing. When the cover is moved from the open position to the closed position, at least one projection interfaces with the filter element and causes the filter element to pivot within the housing, such that the at least one projection seals the filter element and the housing together when the cover is in the closed position.

27 Claims, 20 Drawing Sheets

(51) Int. Cl.
*B01D 46/10* (2006.01)
*B01D 46/42* (2006.01)

(52) U.S. Cl.
CPC ............ *B01D 46/10* (2013.01); *B01D 46/12* (2013.01); *B01D 46/4227* (2013.01); *B01D 2265/025* (2013.01); *B01D 2271/027* (2013.01)

(58) Field of Classification Search
USPC .................................. 55/490, 493, 498, 502
See application file for complete search history.

(56) References Cited

U.S. PATENT DOCUMENTS

| | | | |
|---|---|---|---|
| 4,818,398 A | 4/1989 | Lott et al. | |
| 5,487,828 A | 1/1996 | Goet | |
| 6,126,708 A * | 10/2000 | Mack | B01D 46/0005 55/492 |
| 6,736,874 B2 | 5/2004 | Rieger et al. | |
| 6,881,238 B2 | 4/2005 | Marchart et al. | |
| 7,344,577 B2 * | 3/2008 | Berkhoel | B01D 46/008 210/237 |
| 7,597,735 B2 | 10/2009 | Terres et al. | |
| 7,959,700 B2 | 6/2011 | Kidman | |
| 8,163,057 B2 | 4/2012 | Blossey et al. | |
| 8,444,733 B2 | 5/2013 | Thienel | |
| 8,551,206 B2 * | 10/2013 | Cosgrove | B01D 46/0002 55/480 |
| 8,597,390 B2 | 12/2013 | Aizawa et al. | |
| 8,668,756 B2 | 3/2014 | Zou et al. | |
| 8,734,572 B2 * | 5/2014 | Zhang | B01D 46/0005 55/374 |
| 2003/0230063 A1 | 12/2003 | Kubokawa et al. | |
| 2009/0064645 A1 | 3/2009 | Mahler | |
| 2009/0241493 A1 * | 10/2009 | Sprague | E04B 2/827 55/493 |
| 2010/0043367 A1 | 2/2010 | Desjardins | |
| 2010/0096315 A1 | 4/2010 | Gillenberg et al. | |
| 2010/0154368 A1 | 6/2010 | Kopec et al. | |
| 2010/0257828 A1 * | 10/2010 | Shimomura | B01D 46/0004 55/493 |
| 2011/0138761 A1 | 6/2011 | Blossey et al. | |
| 2012/0060453 A1 | 3/2012 | Holzmann et al. | |
| 2012/0060454 A1 * | 3/2012 | Banks | B01D 46/0005 55/493 |
| 2012/0067323 A1 | 3/2012 | Patwardhan et al. | |
| 2013/0152526 A1 | 6/2013 | Menssen et al. | |
| 2013/0167491 A1 | 7/2013 | Engelland et al. | |
| 2013/0247526 A1 | 9/2013 | Coulonvaux et al. | |

OTHER PUBLICATIONS

International Search Report and Written Opinion for PCT/US2015/033500, dated Oct. 5, 2015, 11 pages.

* cited by examiner

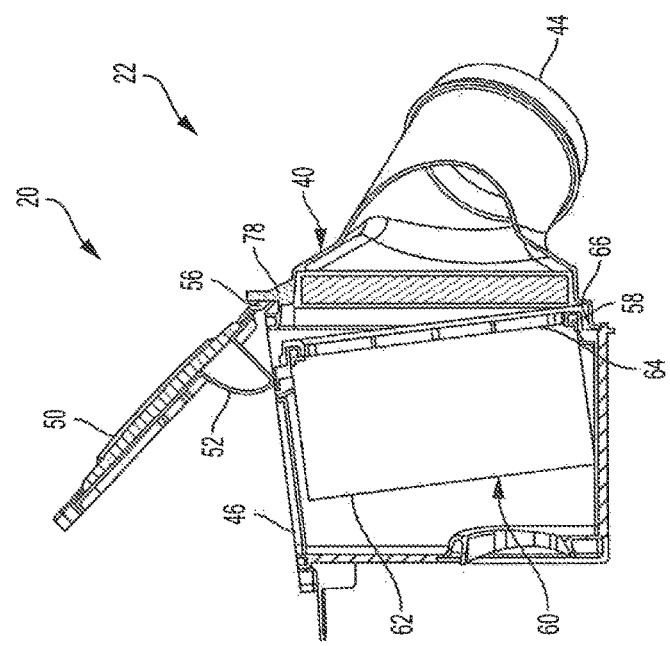
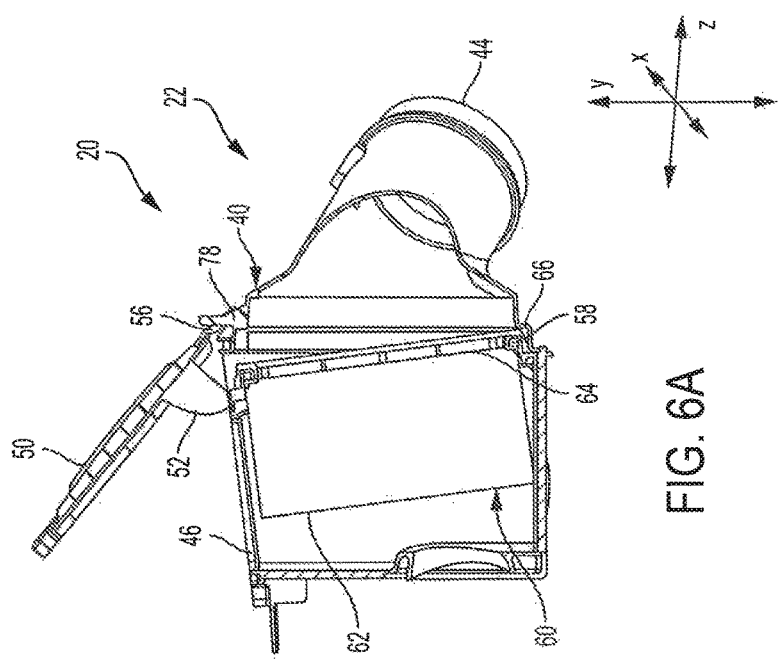
FIG. 6B
FIG. 6A

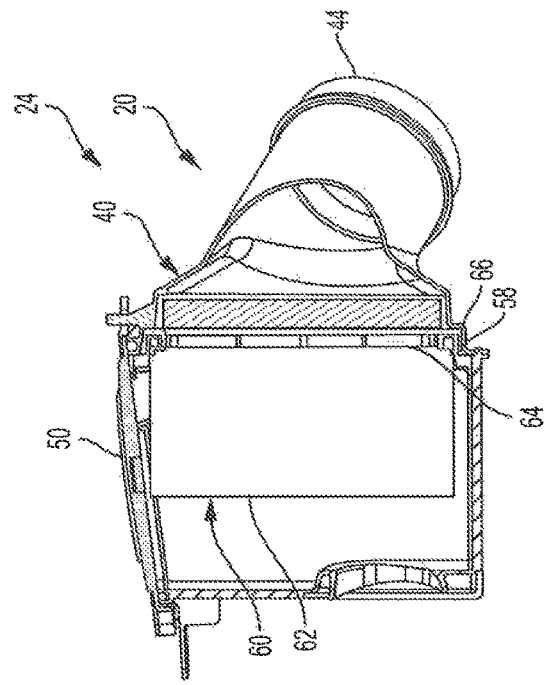
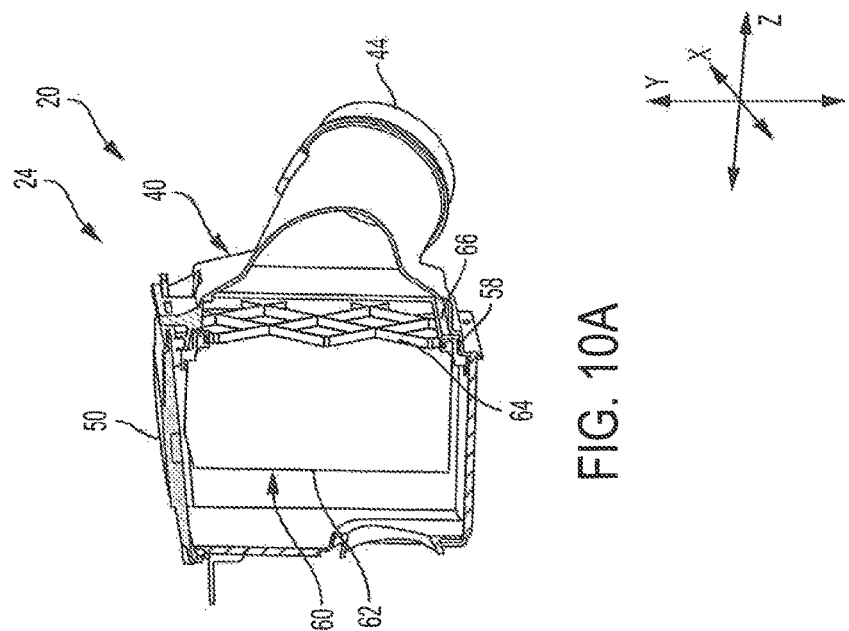

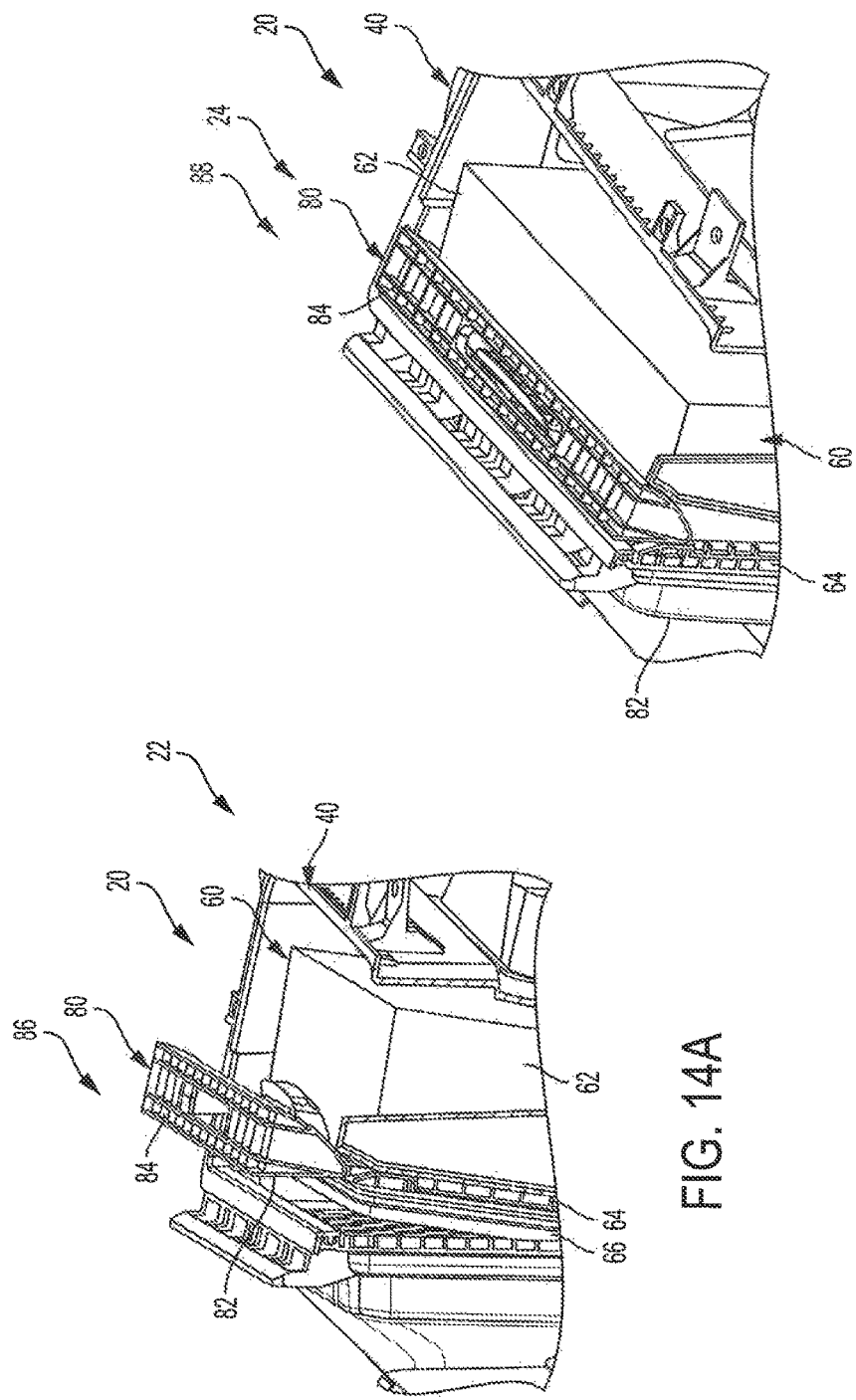

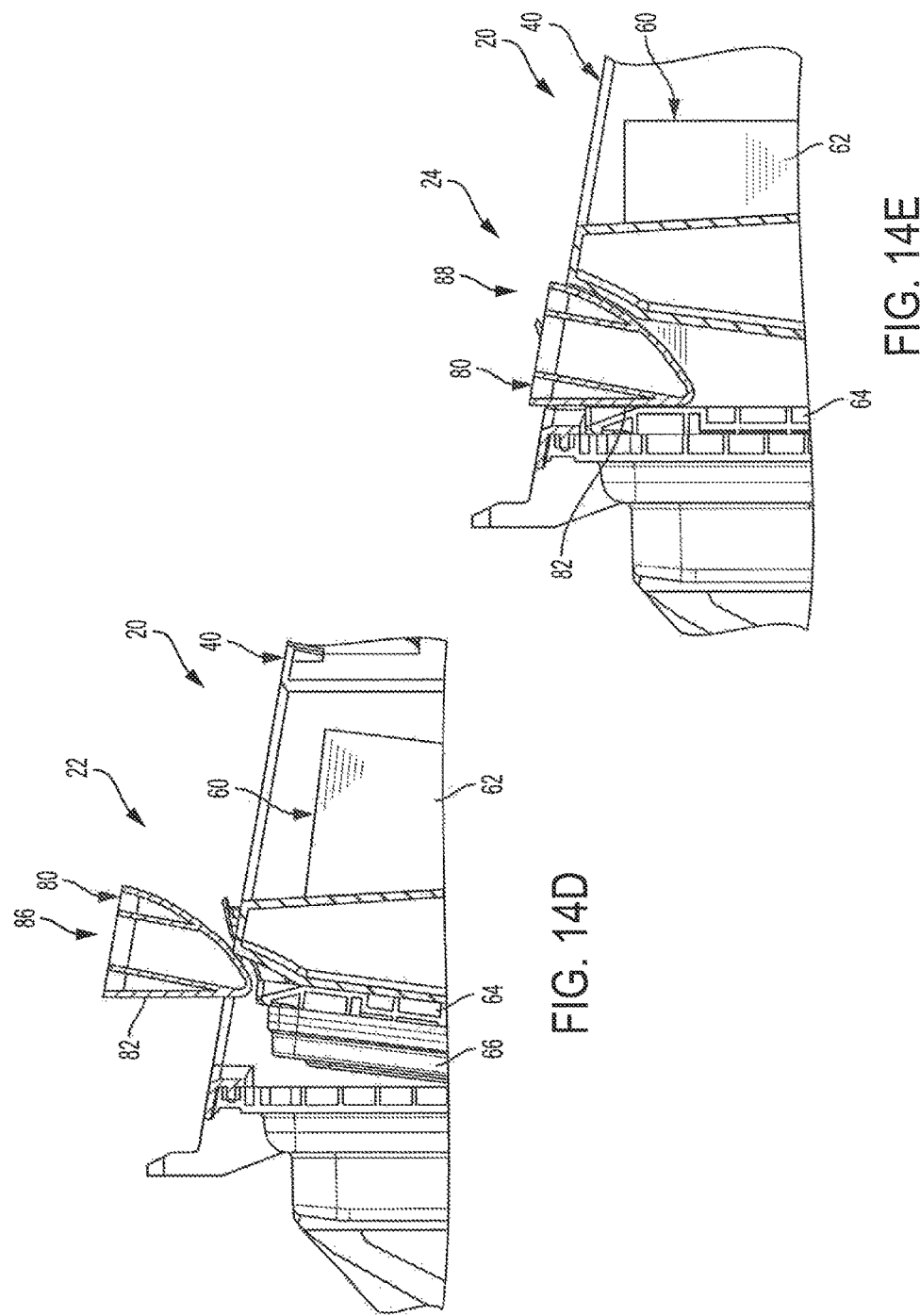

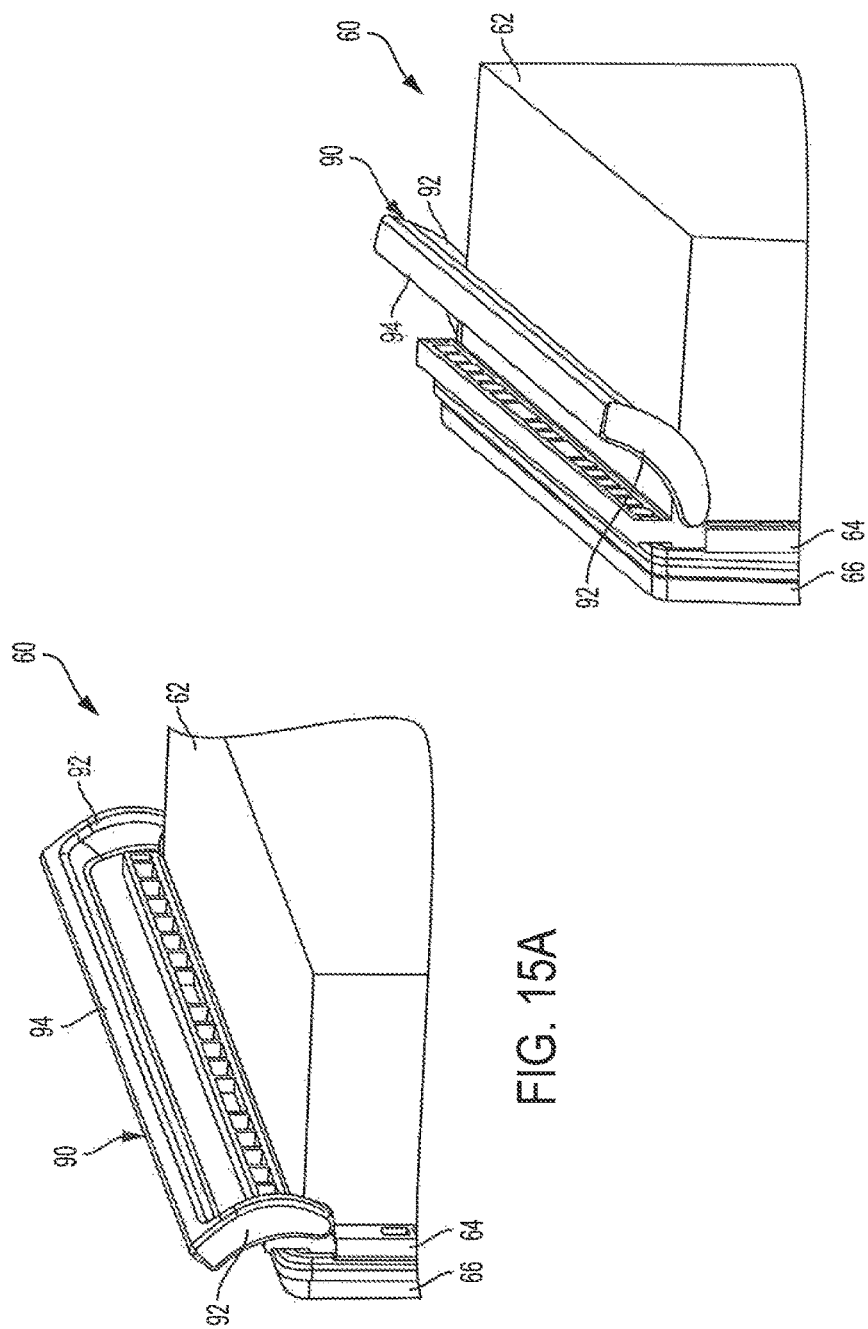

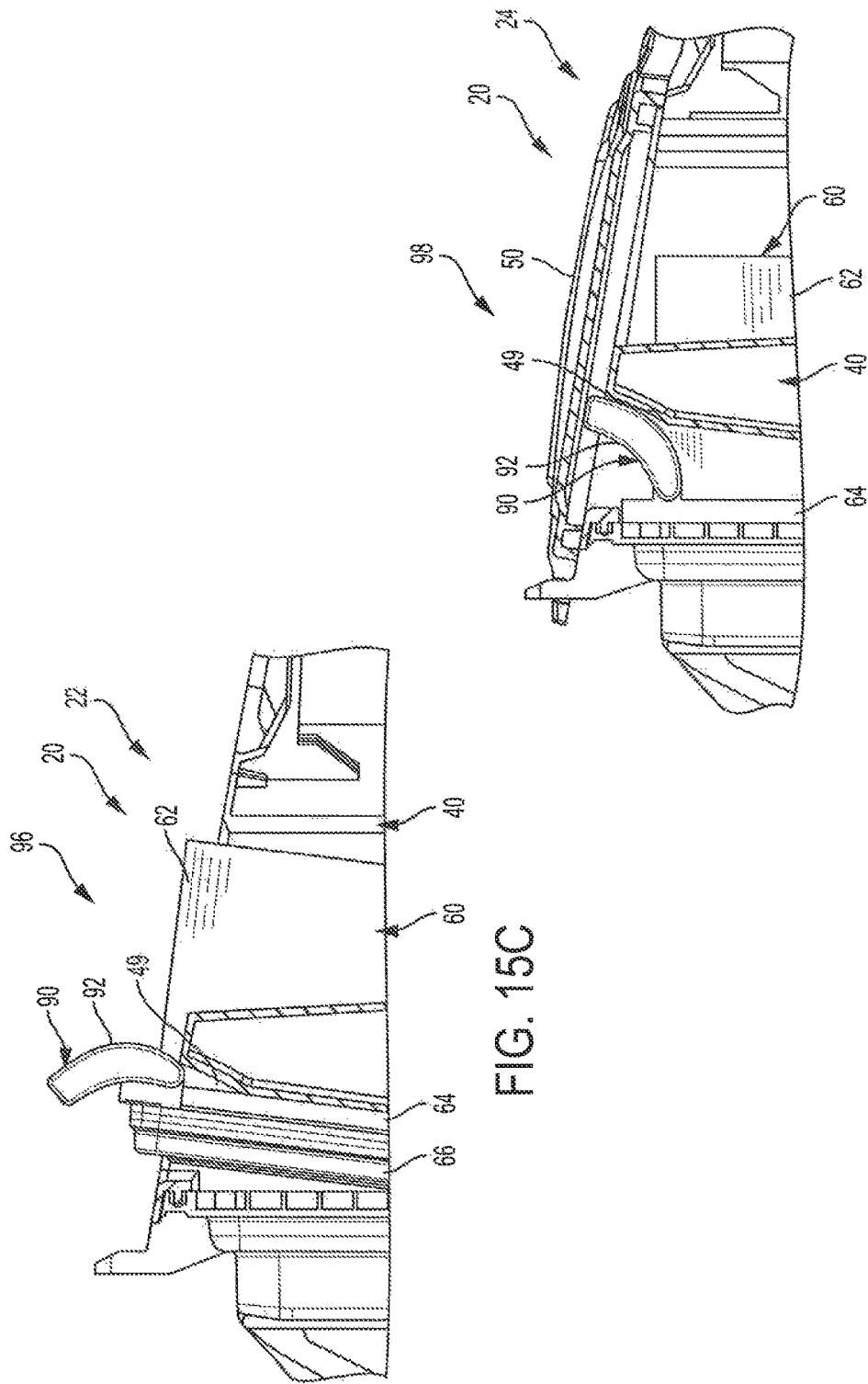

FILTER ASSEMBLY WITH CAM-LOCK FILTER INTERFACE

CROSS REFERENCE TO RELATED APPLICATIONS

This application is a National Stage of PCT Application No. PCT/US2015/033500, filed Jun. 1, 2015, which claims priority to and the benefit of U.S. Provisional Patent Application No. 62/007,283, filed Jun. 3, 2014. The contents of both applications are herein incorporated by reference in their entirety and for all purposes.

FIELD

The present invention relates generally to filter assemblies.

BACKGROUND

Typically, current filters, such as air cleaners, include a main housing, a cover, and a primary filter element. The filter element is removable from the housing for servicing or replacement. In order to secure the filter element within the housing, the filter element is sandwiched or axially sealed between the cover and the housing. Accordingly, it is difficult to properly position the filter element within the housing and further ensure that a proper seal is achieved. Additionally, the geometry of the filter element can make it difficult to remove the filter element from the housing.

SUMMARY

Various embodiments provide for a filter assembly comprising a housing and a cover movably connected to the housing and movable between an open position and a closed position. At least one projection extends from the cover towards an interior of the housing and a filter element that fits at least partially within the housing. When the cover is moved from the open position to the closed position, at least one projection interfaces with the filter element and causes the filter element to pivot within the housing, such that the at least one projection seals the filter element and the housing together when the cover is in the closed position.

Other embodiments provide for a filter assembly that includes a housing, a filter element that fits at least partially within the housing, and a wedge unit that is movable relative to the housing and the filter element between a disengaged position and an engaged position. The wedge unit includes at least one projection extending toward an interior of the housing. When the wedge unit is moved from the disengaged position to the engaged position, the at least one projection interfaces with the filter element and the housing and causes the filter element to pivot within the housing, such that the at least one projection seals the filter element and the housing together when the wedge unit is in the engaged position.

Still other embodiments provide for a filter assembly including a housing and a filter element that fits at least partially within the housing. The filter element includes a filter element body and a cam unit. The cam unit is movably attached to the filter element body and movable between a disengaged position and an engaged position when the filter element is positioned within the housing. The cam unit includes at least one projection extending toward an interior of the housing. When the cam unit is rotated from the disengaged position to the engaged position, the at least one projection interfaces with the housing and causes the filter element to pivot within the housing, such that the at least one projection seals the filter element and the housing together when the cam unit is in the engaged position.

Even further, other embodiments provide for a filter element including a filter element body and a cam unit. The cam unit is movably attached to the filter element body and movable between a disengaged position and an engaged position when the filter element is positioned within a housing. The cam unit includes at least one projection. When the filter element is positioned within the housing and the cam unit is rotated from the disengaged position to the engaged position, the at least one projection interfaces with the housing and causes the filter element body to pivot within the housing, such that the at least one projection seals the filter element and the housing together when the cam unit is in the engaged position.

Additional embodiments provide for a method of sealing a filter, including inserting a filter element into a housing, aligning an edge of the filter element with an edge of the housing; and closing a cover on the housing, thereby causing the filter element to pivot within and seal with the housing.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 6A-6B are cross-sectional, side views of the filter assembly of FIGS. 1A-1B with a cover in an open position.

FIGS. 10A-10B are cross-sectional perspective and side views, respectively, of the filter assembly of FIGS. 9A-9B.

FIGS. 14A-14C are perspective views of a filter assembly according to another embodiment, and FIGS. 14D-14F are cross-sectional side views thereof;

DETAILED DESCRIPTION

Referring to the figures generally, the various embodiments disclosed herein relate to a filter assembly, such as an air cleaner, with a filter element and a housing. The filter element may be removably attachable to the housing and the housing may be configured such that closing a cover to the housing may properly position, align, and seal the filter element to the housing. For example, the housing may include a cam mechanism or protrusion to cause the filter element to pivot into a sealing relationship with the housing as the cover is closed.

The filter assembly, as described further herein, may therefore eliminate installation error, improve the ease of use and installation, and ensure that the filter element is properly assembled and positioned and a robust seal is achieved. The filter assembly may further allow the filter element to be easily serviced.

According to one embodiment, the filter assembly may include components which interact to allow a filter element to be secured within and completely sealed to the filter assembly. In order to obtain such a connection and seal, the filter element is inserted into the housing and a cover of the housing is moved from an open position to a closed position by rotating about a first pivot axis. As the cover is being closed, the cover causes the filter element to move to a sealed position within the filter assembly (the filter element may rotate about a second pivot axis within the housing). For example, the cover may include at least one cam or projection along an inside surface to mechanically link to a portion of the filter element and push the filter element into a sealed position. As the cover is moved toward to the housing, the projection extends into the housing and rotates into a pocket or opening of the housing (e.g. the path of the arc of the projection may extend into the pocket). A portion of the filter element (e.g. the frame) lies in the path of the arc (within the housing). Therefore, as the projection is moved further into the housing, the projection acts against the filter element. As the cover continues to rotate, the projection pushes the filter element along the arc toward a filter seal area of the housing. Once the cover is completely in the closed position, the projection holds and presses the filter element against the housing, creating a complete seal between the housing and the filter element and maintaining the position of the filter element within the housing.

Figure 1B:
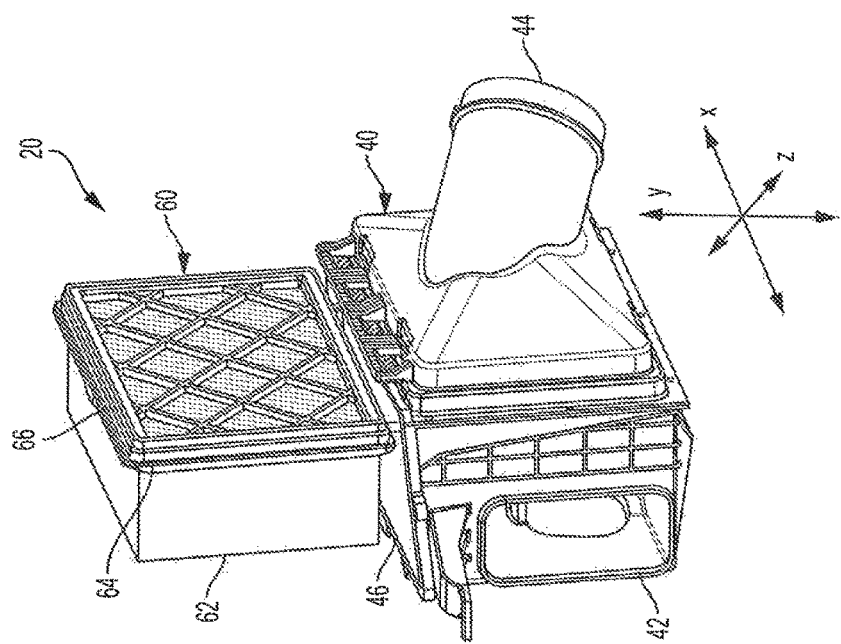
FIGS. 1A-1B are exploded, perspective views of a filter assembly according to one embodiment.
Figure 1A:
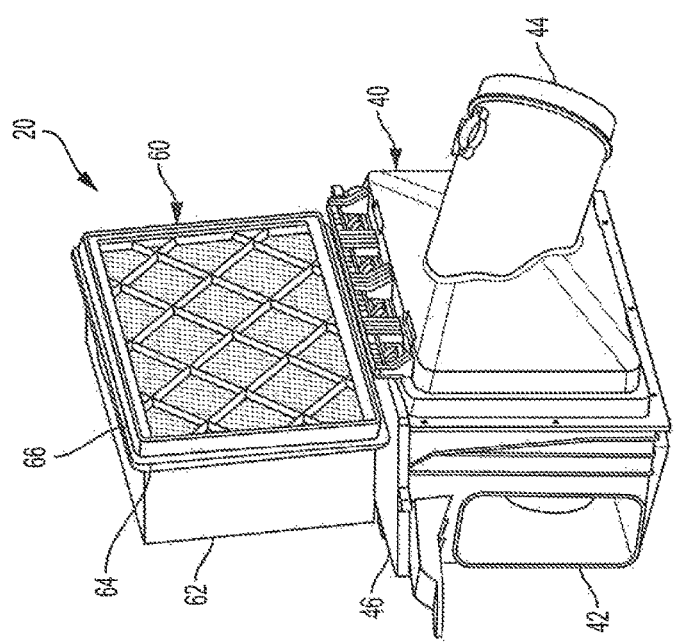
Figure 1C:
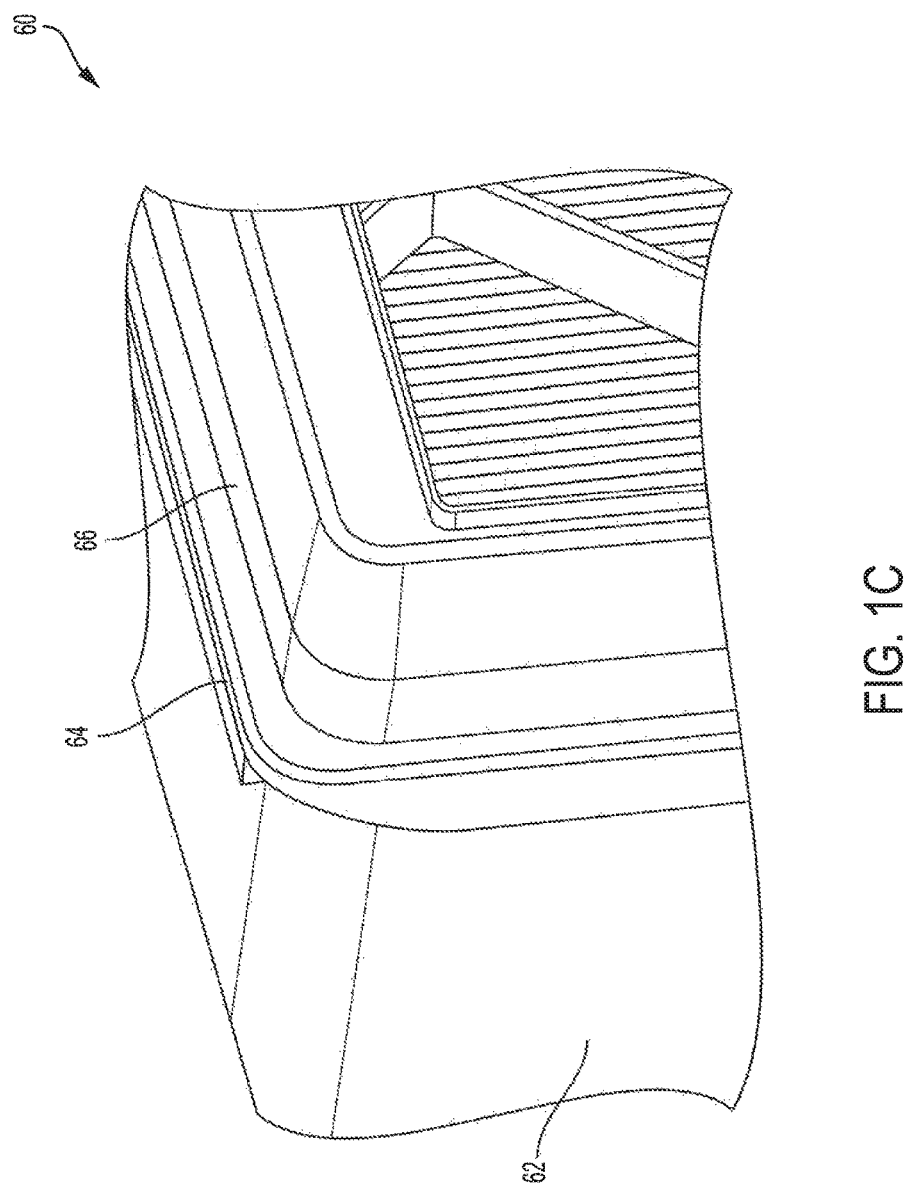
FIG. 1C is a close-up, perspective view of a filter element that may be disposed in the filter assembly of FIGS. 1A-1B.
Figure 2:
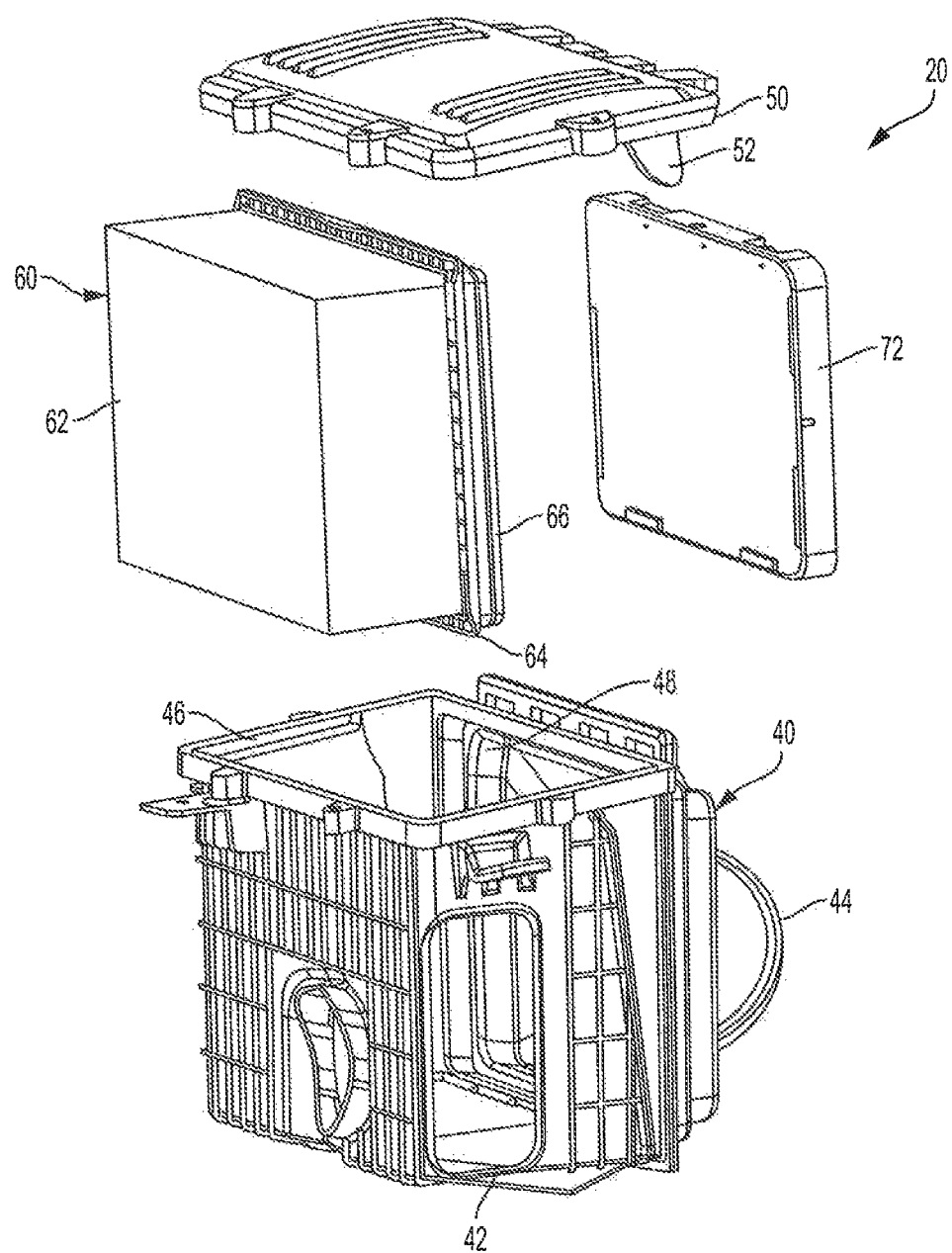
FIG. 2 is an exploded, perspective view of a filter assembly according to one embodiment.

Referring to FIGS. 1A-2, there is shown a panel style air filter, air cleaner, or filter assembly 20. The filter assembly 20 may include a housing 40 and a filter element 60. The housing 40 may be configured to house, hold, or contain the filter element 60. The filter element 60 may be any type of filter, such as a panel filter, and may use or include filter media 62 to filter a variety of materials, including but not limited to a fluid, liquid, gas, or air. The filter element 60 may also include a sleeve, frame portion, or frame 64 and a gasket or seal 66, as shown in greater detail in FIG. 1C. The filter media 62, frame 64, and seal 66 may be integral or separate components, according to the desired configuration. The filter element 60 may optionally include certain features, such as a handle, to assist in removal from the housing 40. A label may be added to the filter element 60 for identification or other informational purposes.

Figure 3B:
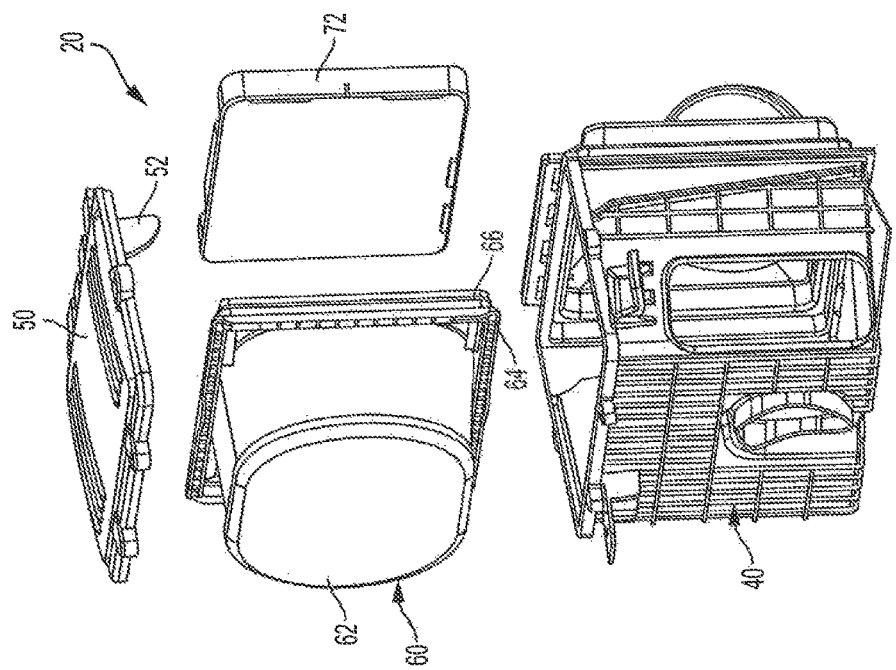
FIGS. 3A-3B are exploded, perspective views of a filter assembly according to another embodiment.
Figure 3A:
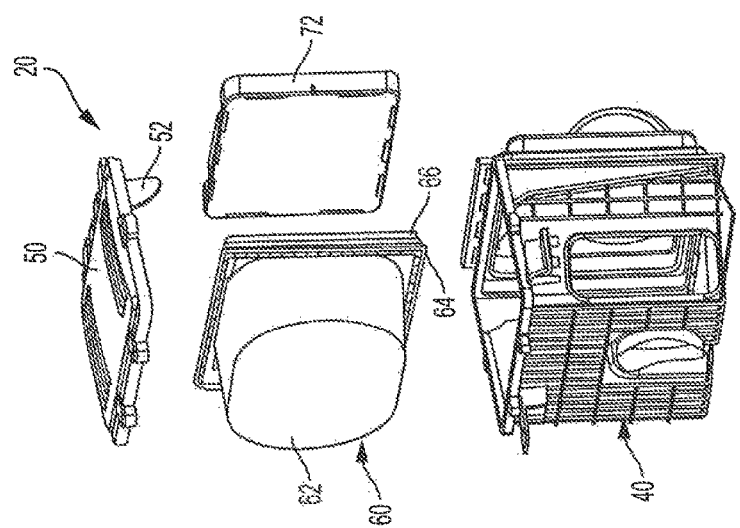
Figure 4B:
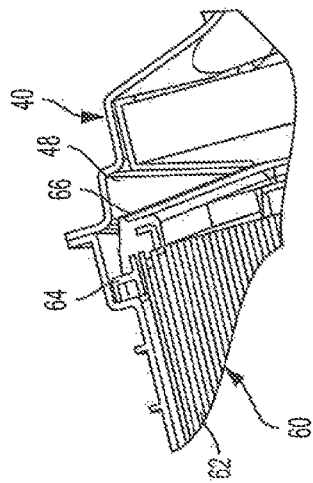
FIGS. 4A-4B are cross-sectional views of a sealing interface between a frame of the filter element and the housing that may be disposed in the filter assembly of FIGS. 1A-1B.

The filter media 62 may be shaped and sized according to the desired configuration and use. The frame 64 and the seal 66 may be shaped and sized to work in conjunction with a variety of different filter media 62. For example, as shown in FIG. 2, the filter media 62 may be generally a rectangular prism and a panel-style filter. According to another embodiment and as shown in FIGS. 3A-3B, the filter media 62 may be generally cylindrical or a cylindrical-style filter. As shown in FIGS. 2-3B, the filter assembly 20 may include a "post cleaner" or a secondary filter element 72. For example, the secondary filter element 72 may have filter media that further filters out fine particles from the material being filtered (e.g. a particulate filter). The filter media of the secondary filter element 72 may optionally have different pore sizes than the filter element 62. For example, the size of the pores within the secondary filter element 72 may optionally be smaller than that of the filter 61. Alternatively or additionally, the secondary filter element 72 may be used for sound attenuation.

The frame 64 may be used to provide structural support to the filter element 60 and to provide resistance to prevent the filter element 60 from collapsing, while allowing the filter element 60 to be securely and tightly sealed against the housing 40. For example, the frame 64 may comprise a rigid body or structure and may serve as a carrier for the filter element 60. The frame 64 may further prevent the filter element 60 from flexing or deforming Accordingly, the frame 64 may increase the robustness of the filter element 60. The frame 64 may further be shaped or have complementary geometry to interface or interact with a portion of the housing 40, such as a protrusion on the cover of the housing 40. According to one embodiment, the frame 64 may provide or incorporate certain geometry, such as a handle, for ease of servicing and increased functionality.

According to one embodiment, the frame 64 may be sealed to or integral with certain portions of the filter element 60. For example, the seal 66 and the frame 64 may be integrated together, as shown in FIGS. 4A-5B and 11. For example, the frame 64 may be at least partially within the seal 66 and the seal 66 may cover an outer portion or edge of the frame 64 (to interface with the housing 40).

Figure 12B:
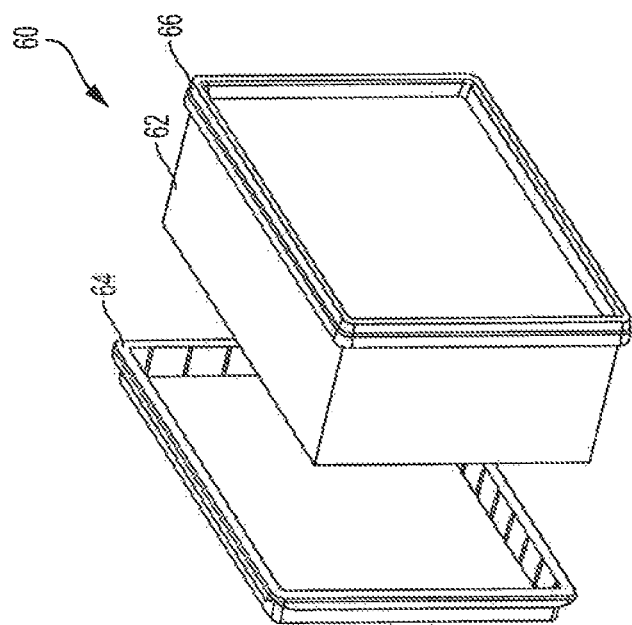
FIGS. 12A-12B are exploded, perspective views of a filter element according to another embodiment.
Figure 12A:
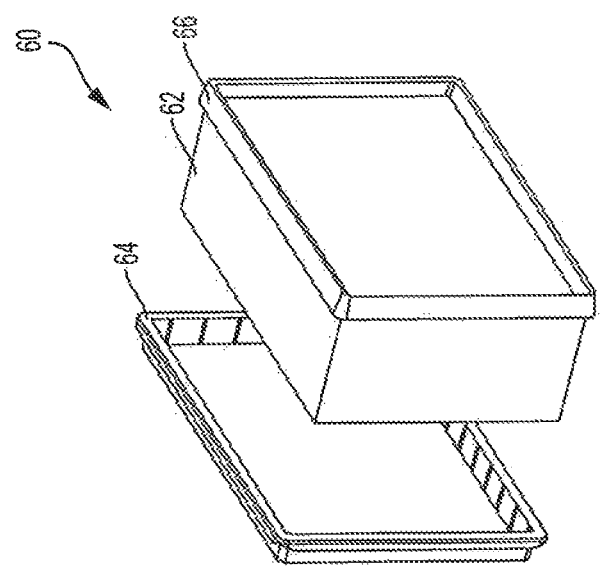

According to another embodiment and as shown in FIGS. 12A-12B, the frame 64 may be a separate component or element from the rest of the filter element 60. The frame 64 may optionally be pressed onto or attached to the filter element 60, thereby providing structural support to the filter element 60. Accordingly, the frame 64 may be reused after the filter element 60 has been replaced. The frame 64 may, in particular embodiments, include an additional compressible gasket or seal to allow the frame 64 to seal to the housing 40.

The frame 64 may be constructed out of a variety of materials. For example, the frame 64 may be a plastic (e.g. polymer) or metal filter frame, which may improve the aesthetics and perceived quality of the filter element 60.

The seal 66 may allow the filter element 60 to completely seal to the housing 40 and prevent leakage or the mixing of filtered material and the unfiltered material within the housing 40. The seal 66 may be a radial seal panel or an extrusion directly attached to a portion of the filter media 62 or frame 64. For example, the seal 66 may encompass an outer portion, circumference, or perimeter of the filter element 60, such as the frame 64 or the filter media 62. The seal 66 may allow the filter element 60 to be assembled and attached to the housing 40 and sealed entirely within the housing 40. Further, the seal 66 may allow both the inlet and outlet ducting to be contained within the housing 40 and fluidly separarted from each other when the cover 50 is in the closed position 24. Alternatively or additionally, the seal 66 may be located on or attached to the housing 40. The seal 66 may use a variety of different technologies or materials to form or create a seal with the housing 40, such as polyurethane.

The housing 40 may be used to hold or secure the filter element 60 and direct or guide the flow of material to be filtered through the filter element 60. The housing 40 may incorporate all ducting and sensor components for ease of service. For example, the housing 40 may include at least one inlet 42 and at least one outlet 44, as shown in FIGS. 1A and 1B, to accept inlet and outlet ducting and for the material being filtered to flow through. However, it is anticipated that the inlet 42 and outlet 44 may be reversed (thereby reversing the direction of flow) or repositioned, according to the desired configuration. The housing 40 may optionally include multiple inlets 42 or outlets 44. The inlet 42 and the outlet 44 may be positioned anywhere along the housing 40. As shown in FIGS. 1A and 1B, the inlet 42 and the outlet 44 may be along different sides of the housing 40 and split between the housing 40 and a cover 50.

Figure 5B:
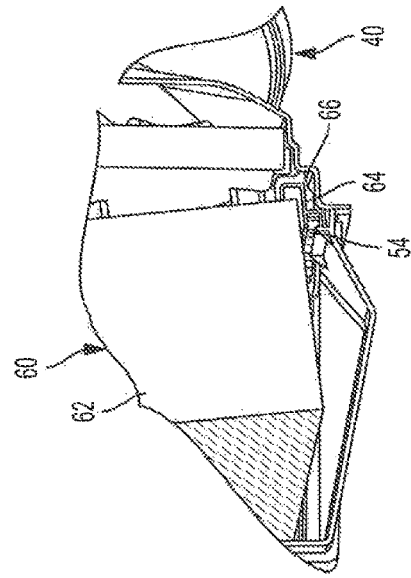
FIGS. 5A-5B are cross-sectional views of the bottom portions of the housing and filter element of FIGS. 1A-1B.
Figure 4A:
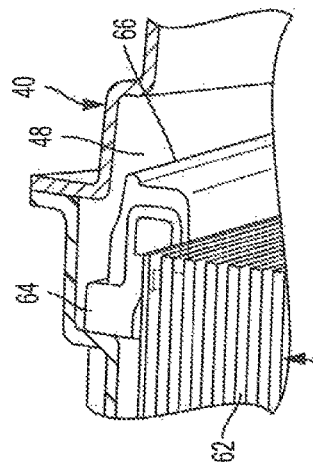
Figure 5A:
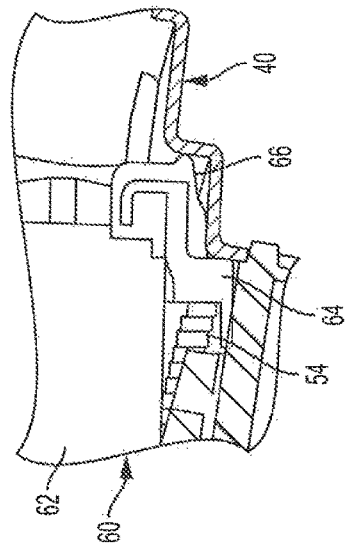

The housing 40 may further include internal alignment features to help guide the filter element 60 into place within the housing 40. FIG. 4A-4B and 5A-5B depicts a sealing interface between the housing 40 and the frame 64 of the filter element 60. As shown in FIG. 5A-5B, the housing 40 may include a ramped surface or ramp 54 at the bottom of the housing 40 to help guide the filter element 60 into proper alignment or position within the housing. The ramp 54 may be angled downward toward the desired location for the filter element 60 to pivot and seal with the housing 40. Accordingly, as the filter element 60 is placed into the housing 40, the bottom edge of the filter element 60 may be guided to and aligned with a bottom edge of the housing 40. The ramp 54 may include a stair-step configuration, rigid steps, or ribs to further guide the filter element 60 and prevent the filter element 60 from moving out of position.

The housing 40 may further include an opening 46 along a portion or side of the housing 40, with the opening 46 being large enough for the filter element 60 to fit through, allowing the filter element 60 be inserted through the opening 46 and into the housing 40. Subsequently, the opening 46 may be sealed, covered, or closed off with the lid, a rotating piece, or the cover 50. The opening 46 and the cover 50 may be positioned anywhere along the sides of the housing 40. However, as shown in FIGS. 1A-1B, 6A-6B, and 10A-10B, the opening 46 and the cover 50 may be on the top of the housing 40, allowing the filter element 60 to be inserted through the top of the housing 40.

The cover 50 may be movably attached or connected to the housing 40 through a variety of different mechanisms. For example, the cover 50 may have a hinge interface with or be hingeably attached to the housing 40 to the cover 50 to move, pivot, or rotate between an open position 22 (as shown in FIGS. 6A-6B) and a closed position 24 (as shown in FIGS. 10A-10B) about a first pivot point or axis 78 (substantially parallel to the x-axis). While the cover 50 is in the open position 22, the inside of the housing 40 may be accessed and the filter element 60 may be inserted or moved into the housing 40. While the cover 50 is in the closed position 24, the cover 50 may close off the opening 46 and be attached on either side to the housing 40. In the closed position 24, the cover 50 secures and fixes the filter element 60 within the housing 40.

Figure 13B:
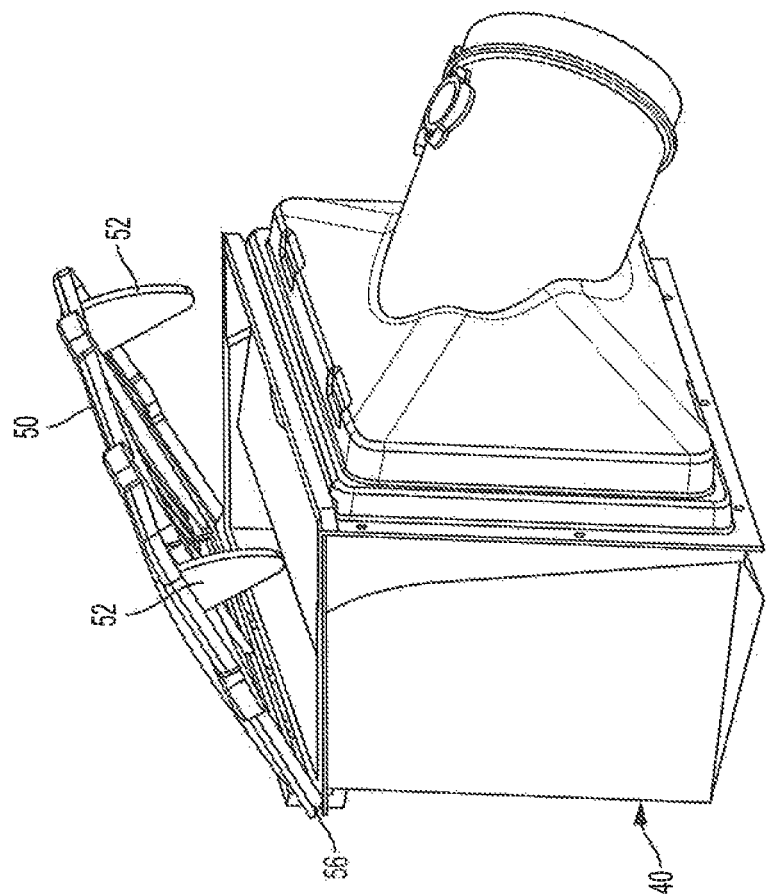
FIGS. 13A-13B are perspective views of a filter assembly according to another embodiment.
Figure 13A:
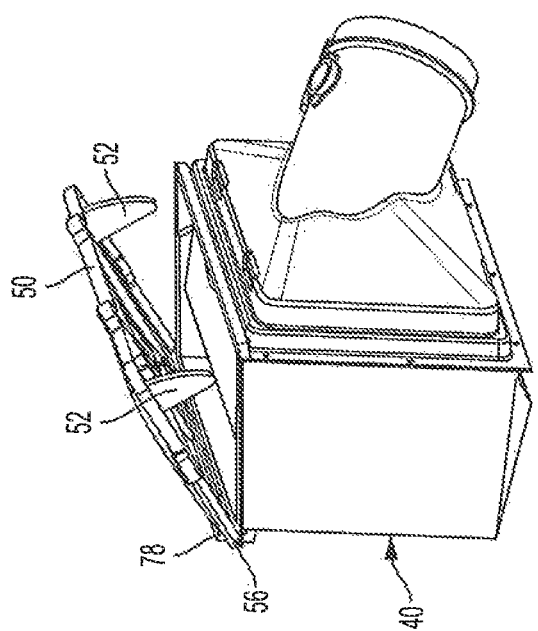

According to one embodiment as shown in FIGS. 6A-6B, the cover 50 may be hingeably attached or connected to the housing 40 such that the hinge 56 is on the same side (about a lengthwise axis parallel to the x-axis and the first pivot axis 78) of the cover 50 as projections 52 (described further herein). As shown in FIGS. 10A-10B, when the cover 50 is closed, the opposite side (from the hinge 56) of the cover 50 may attach to the housing 40. The hinge 56 allows the cover 56 to rotate or pivot about an axis parallel to the x-axis (i.e., the first pivot axis 78). The cover 50 may attach or connect to the housing 40 through a variety of different mechanisms, including but not limited to mechanical fasteners, latches, or magnets. According to another embodiment as shown in FIGS. 13A-13B, the hinge 56 may be on the opposite side of the cover 50 as the projections 52.

Figure 7:
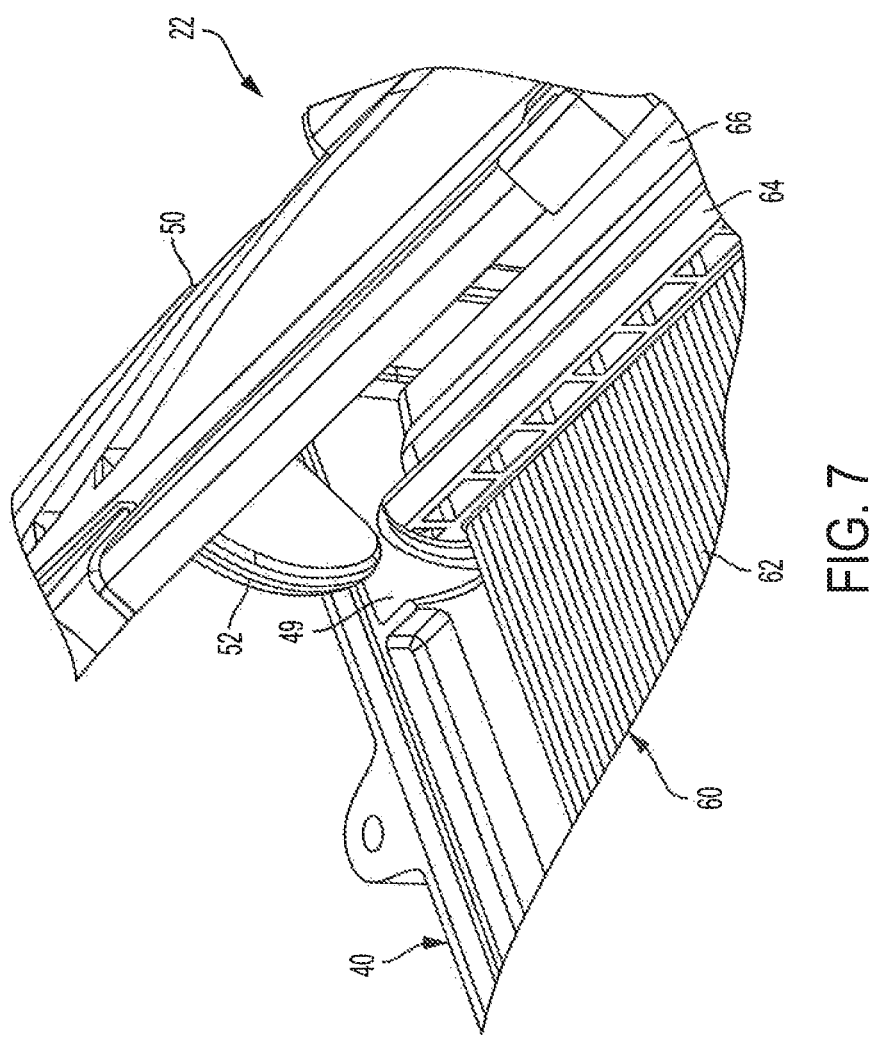
FIG. 7 is a perspective view of a projection on the cover of the filter assembly of FIGS. 6A-6B.
Figure 8A:
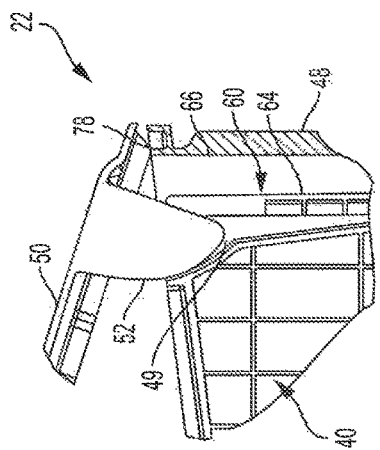
FIGS. 8A-8B are cross-sectional side views of the filter assembly of FIGS. 6A-6B.

According to various embodiments provided herein, the cover 50 and the projections 52 are used to ensure that the filter element 60 is positioned properly within the housing 40 and to engage and completely seal the filter element 60 to the housing 40. For example, as shown in FIG. 7, at least one cam-shaped mechanism, surface, feature, rigid extension, protrusion, or projection 52 extends from the cover 50. The cam or projection 52 may comprise, for example, a projection on a rotating part of machinery (e.g. the cover 50) or a rotating or sliding piece, which may be designed to mechanically link or make sliding contact with another part (e.g. the filter element 60) while rotating or sliding. Therefore, the cam or projection 52 may interface the filter element 50 and thereby impart or result in reciprocal or variable motion to the filter element 60 as the cover 50 is being moved. The projection 52 may be positioned so as to directly or indirectly interact or interface with the filter element 60 as the cover 50 is being closed toward the housing 40 and once the filter element 60 is within the housing 40. As the cover 50 is being moved into the closed position 24, the projection 52 extends into the filter housing 60 and abuts the filter element 60, which causes the filter element 60 to rotate or pivot within the housing 40, thus creating a seal between the filter element 60 and the housing 40. A radial seal may optionally be formed between the filter element 60 and the housing 40. When the cover 50 is closed, the projections 52 may extend or protrude outwardly from the cover 50 toward the interior of the housing 40 and continue to press the filter element 60 toward the housing 40 to maintain the position of the filter element 60 within the housing 40.

The projection 52 may optionally be integral with the cover 50. Any number of projections 52 may be located along the inside surface of the cover 50. According to one embodiment, the cover 50 may include two projections 52, as shown in FIGS. 13A-13B. The projection(s) 52 may be located on the same side of the housing 40 as the frame 64 and seal 66 (when the filter element 60 has been inserted into the housing 40) to allow the projection 52 to engage with the frame 64 and pivot the filter element 60.

The projection 52 may be shaped and sized to allow the cover 50 to interact with the filter element 60 (e.g. the frame 64) and fit within a slot 49 of the housing 40. For example, as shown in FIGS. 8A-9B, the projection 52 may be curved along one side to allow the projection to fit within the slot 49 in the housing 40 (as the cover 50 is being closed). This curved side is configured to abut a surface within the slot 49 when the cover 50 is in the closed position to help push the filter element 60. The other side of the projection 52 may be flat to push against a portion of the filter element 60, such as the frame 64, in order to cause the filter element 60 to move, rotate, or pivot about a second pivot point or axis 58 (substantially parallel to the x-axis and the first pivot axis 78 and as shown in FIGS. 6A-6B and 10A-10B). Accordingly, as the cover 50 is moved to the closed position 24, the projection 52 wedges in between the housing 40 and the filter element 40 to move the filter element 60 within and with respect to the housing 40.

The inside of the housing 40 may further be shaped to receive the projection 52, as shown in FIG. 7. For example, as the cover 50 pivots closed, the projection 52 may slide within a curved recessed area, pocket, or slot 49 along a wall or portion of the housing 40. The slot 49 provides an area for the projection 52 to extend into and supports the projection 52 as the projection 52 pushes the filter element 60.

As shown in FIGS. 9A-11, for example, the filter element 60 is configured to sealingly fit within the housing 40. For example, the housing 40 may have complementary geometry to allow the filter element 60 to fit within and seal to the housing 40. More specifically, the housing 40 may optionally include a filter seal area 48, which may be the recessed area within the inside of the housing 40. The filter seal area 48 may be shaped and sized to accept and seal the seal 66 of the filter element 60. In the closed position 24, the seal 66 directly abuts and seals with the seal area 48. The filter seal area 48 may be on a different plane or side of the housing 40 than the interface between the cover 50 and the housing 40. According to another embodiment, the seal 66 may be located on the housing 40 and the seal area 48 may be located on the filter element 60. According to yet another embodiment, the filter element 60 (without a seal area 48) may directly seal with the seal 66 located on the housing 40.

To install the filter element 60 and create a seal between the filter element 60 and the housing 40, the filter element 60 may be moved through the opening 46 on the top of the housing 40 while the cover 50 is in the open position 22. As shown in FIGS. 4A-11, the filter element 60 may be guided into the correct place within the housing 40 and into a sealed position within the housing 40 via an interaction between the frame 64 and the internal geometry of the housing 40. For example, as the filter element 60 is being placed within the housing 40, the filter element 60 may be guided by internal housing features, as shown in FIGS. 4A-5B, toward where the filter element 60 may pivot. For example, FIGS. 5A-5B depict the ramp 54 engaging with the bottom edge of the filter element 60, thereby locking a bottom edge of the filter element 60 in position within the housing 40 while still allowing the filter element 60 to pivot in place (as shown in FIGS. 6A-6B).

Once the filter element 60 has been positioned properly along the ramp 54, the filter element 60 may be pivotable (along the second pivot axis 58 and about the x-axis) with respect to and along the bottom portion of the housing 40, as shown in FIGS. 6A-6B and 10A-10B. Before the cover 50 is closed, there may be a gap or space between the top edge of the filter element 60 and the filter seal area 48, while the bottom edge of the filter element 60 (e.g. the seal 66) may be directly next to the bottom edge of the filter seal area 48, as shown in FIGS. 6A-6B.

Figure 9A:
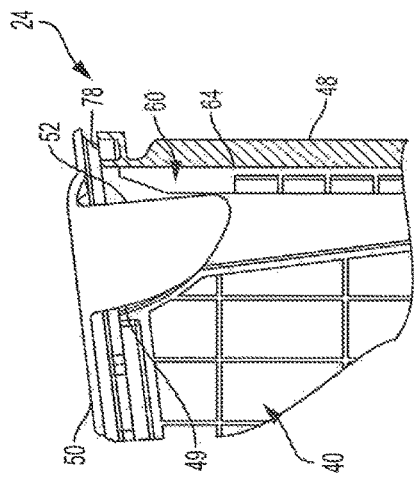
FIGS. 9A-9B are cross-sectional side views of the filter assembly of FIGS. 1A-1B with a cover in a closed position.
Figure 8B:
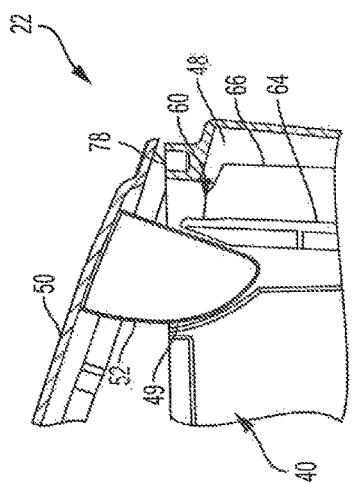
Figure 9B:
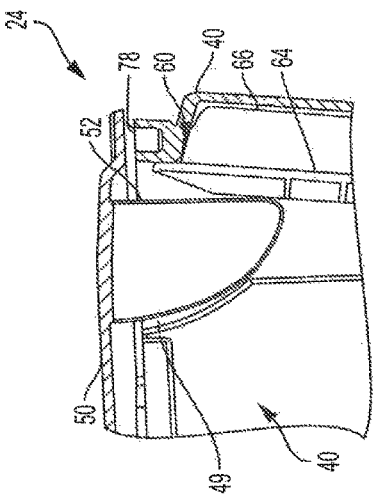

Once the filter element 60 has been placed within the housing 40 and guided to the correct location by the ramp 54, the cover 50 may be closed. As the cover 50 rotates with respect to the housing 40 into the closed position 24, the projection(s) 52 may move into the pocket 49 of the housing 40 (as shown in FIGS. 7-9B) to engage with a portion of the filter element 60 (such as the frame 64), thereby acting as a cam on the filter element 60. As the projection(s) 52 press or push against the filter element 60, the filter element 60 moves, rotates, or pivots about the second pivot axis 58 (along a bottom portion of the housing 40, as shown in FIGS. 6A-6B and 10A-10B) within the housing 40 and toward the filter seal area 48. The projection(s) 52 eventually cause the entire seal 66 of the filter element 60 to be pressed firmly against the filter seal area 48, creating a complete seal between the housing 40 and the filter element 60. The projection 52 may maintain seal by maintaining the position of the filter element 60 and the pressure between and a sufficient force toward the seal 66 and the filter seal area 48 by pressing against internal components of the housing 40, such as the pocket 49 as shown in FIGS. 9A-9B.

Figure 11:
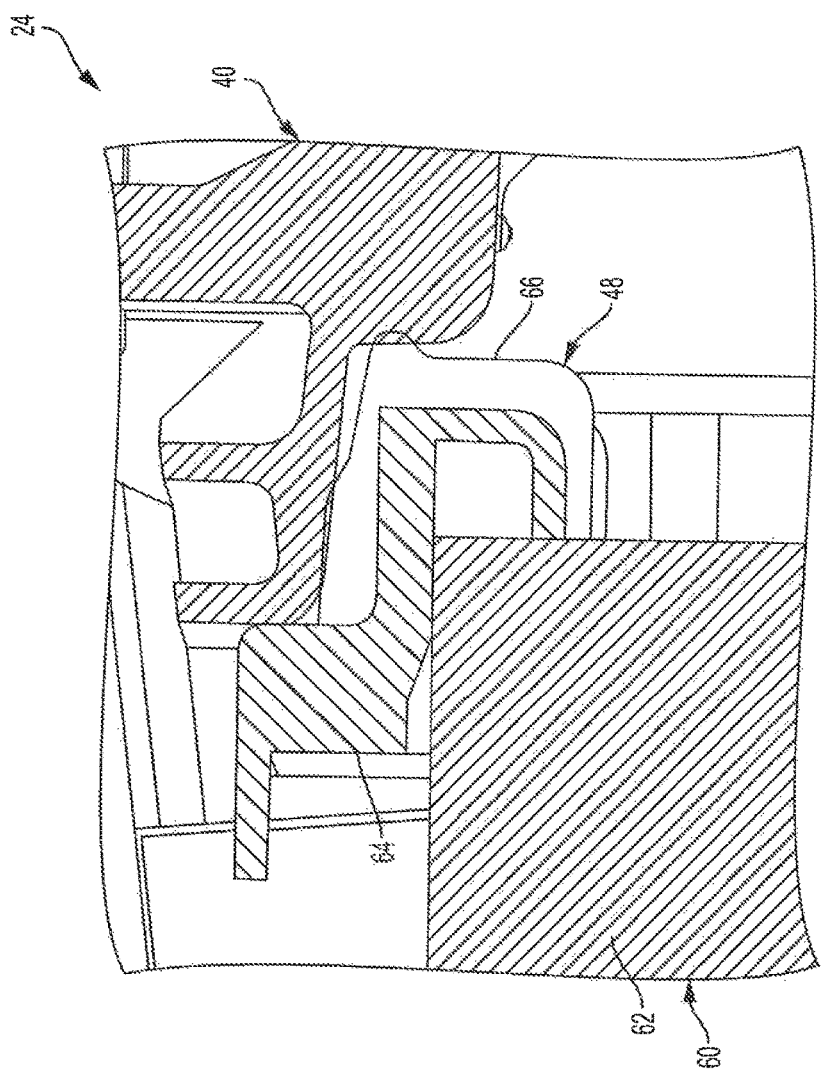
FIG. 11 is a cross-sectional, view of the filter assembly of FIGS. 10A-10B.

Accordingly, when the cover 50 is closed or engaged, the projection 52 ensures that the filter element 60 is completely and evenly sealed to the housing 40 through the seal 66 and the filter seal area 48, as shown in FIGS. 10A-11. The seal 66 may contact the filter seal area 48 along at least one plane or surface. For example, as shown in FIG. 11, the seal 66 may directly contact the filter seal area 48 in two areas (as shown in the cross-sectional plane view). The seal 66 may contact the filter seal area 48 around the entire perimeter of the filter element 60 to create and ensure a complete seal. The cover 50, with the projections 52, may therefore help fix or maintain the position of the filter element 60 within the housing 40. According to one embodiment, the cover 50 and the projections 52 may allow the filter element 60 to only be sealed to the housing 40, allowing the filter assembly 20 to be easily serviced.

Once the filter element 60 is in a complete seal with the housing 40, as shown in FIGS. 10A-11, the filter element 60 and/or the cover 50 may optionally be further locked in place with, for example, mechanical fasteners or latches, to the housing 40.

Figure 14C:
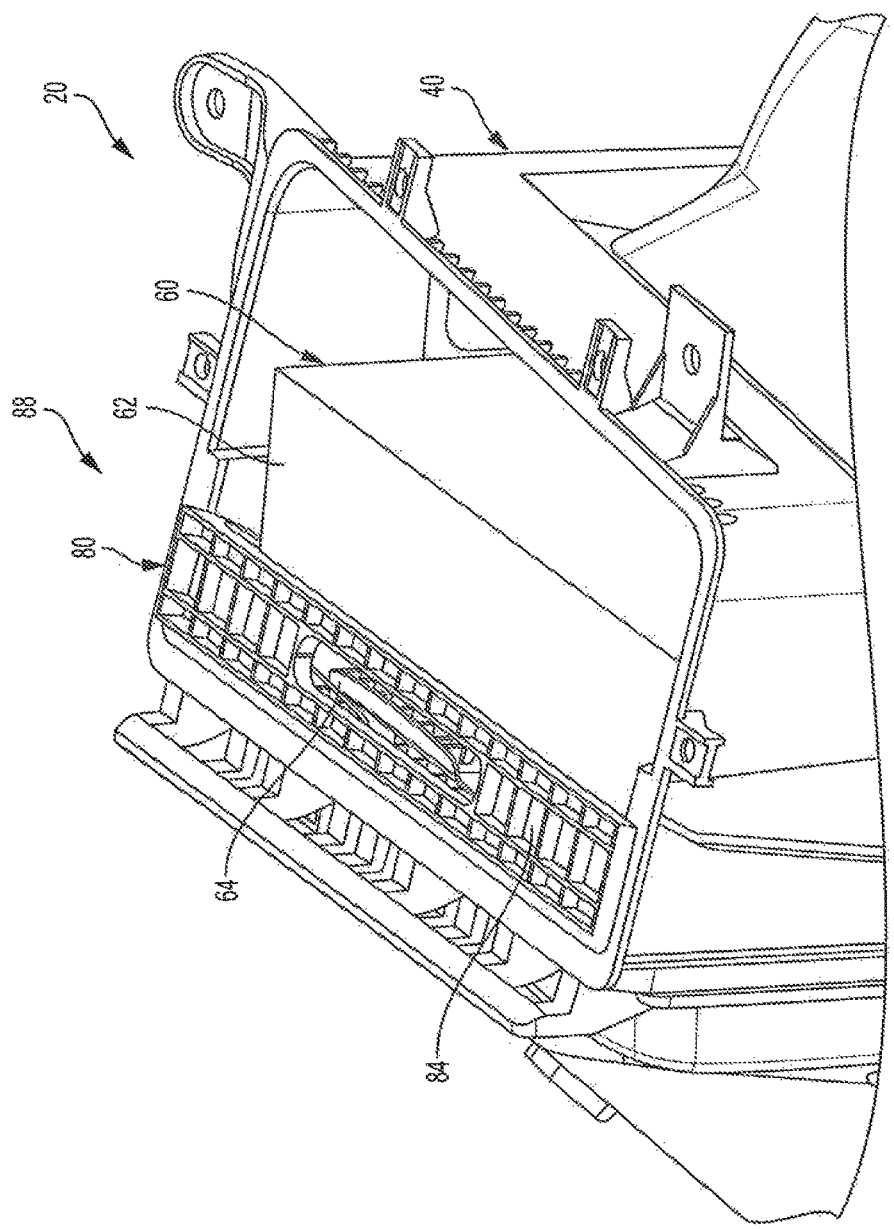
Figure 14F:
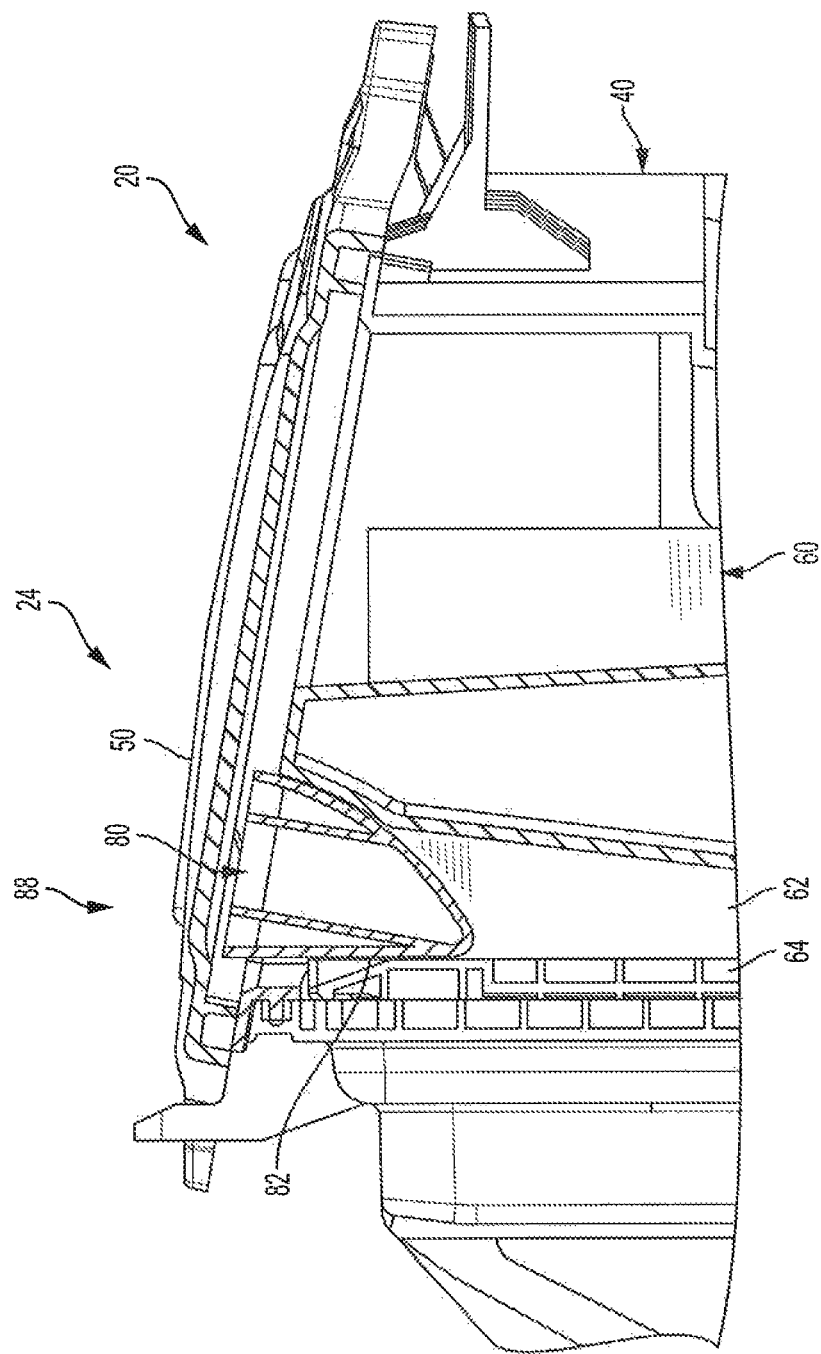

According to another embodiment, as shown in FIGS. 14A-14F, the filter assembly 20 may include a wedge unit 80 to help seal the filter element 60 to the housing 40. The wedge unit 80 is movable relative to the housing 40 between a disengaged position 86 and an engaged position 88 in order to create a seal between the filter element 60 and the housing 40, as described further herein. The wedge unit 80 may include at least one protrusion or projection 82 to interact with a portion of the filter element 60 (such as the frame 64) and to push or move the filter element 60 into a sealed configuration with the frame 64. The wedge unit 80 may be shaped and sized to fit at least partially around a portion of the filter element 60. For example, the wedge unit 80 extends between two opposite sides of the filter element 60. The wedge unit 80 may include two projections 82 and an extended portion 84 connecting the two projections 82. As shown in FIG. 14B, the extended portion 84 may extend along the top of the filter element 60, and the projections 82 may extend along a portion of two opposite sides of the filter element 60. The projections 82 may be shaped and sized similar to the projection 52 and function similarly to the projection 52.

The filter element 60 may first be inserted into the housing 40 while the wedge unit is in the disengaged position 86. Once the filter element 60 is in place within the housing 40, and prior to sealing the filter element 60 to the housing 40 (e.g. in the open position 22), the wedge unit 80 may be advanced or placed into the top of the housing 40 (in the disengaged position 86), as shown in FIGS. 14A and 14D. Similar to the projections 52, as the wedge unit 80 is advanced toward the filter 60, the projections 82 may be moved into the engaged position 88 by wedging between a portion of the housing 40 (such as the pocket 49) and the filter element 60(such as the frame 64) in order to rotate, cam, or pivot the filter element 60 toward the housing 40, as shown in FIGS. 14B, 14C, and 14E. In order to further seal the filter element 60 to the housing 40, the cover 50 may be added and closed onto the wedge unit 80 to prevent the wedge unit 80 from retracting or backing out. The wedge unit 80 may be sandwiched between the cover 50 and the filter element 60 in the engaged position 88.

The wedge unit 80 may be an individual and separate component (e.g. separate from the filter element 60, the housing 40, or the cover 50). However, the wedge unit 80 may be temporarily (e.g. removable or releasable) or permanently attached to any component within the filter assembly 20, such as the cover 50. Alternatively, the wedge unit 80 may be an integral component within the filter assembly 20.

The wedge unit 80 may also include different components or configurations to help secure the wedge unit 80 in place. For example, the wedge unit 80 may snap with or interlock with a portion of the housing 40, the cover 50, and/or the filter element 60.

The wedge unit 80 may include a hole or aperture to allow a portion of the frame 64 to be accessed through. For example, as shown in FIG. 14C, a handle of the frame 64 of the filter element 60 may at least partially extend through the hole in the extended portion 84 to allow the user to grasp and move the frame 64 (e.g. to remove the filter element 60 to be serviced).

Figure 15E:
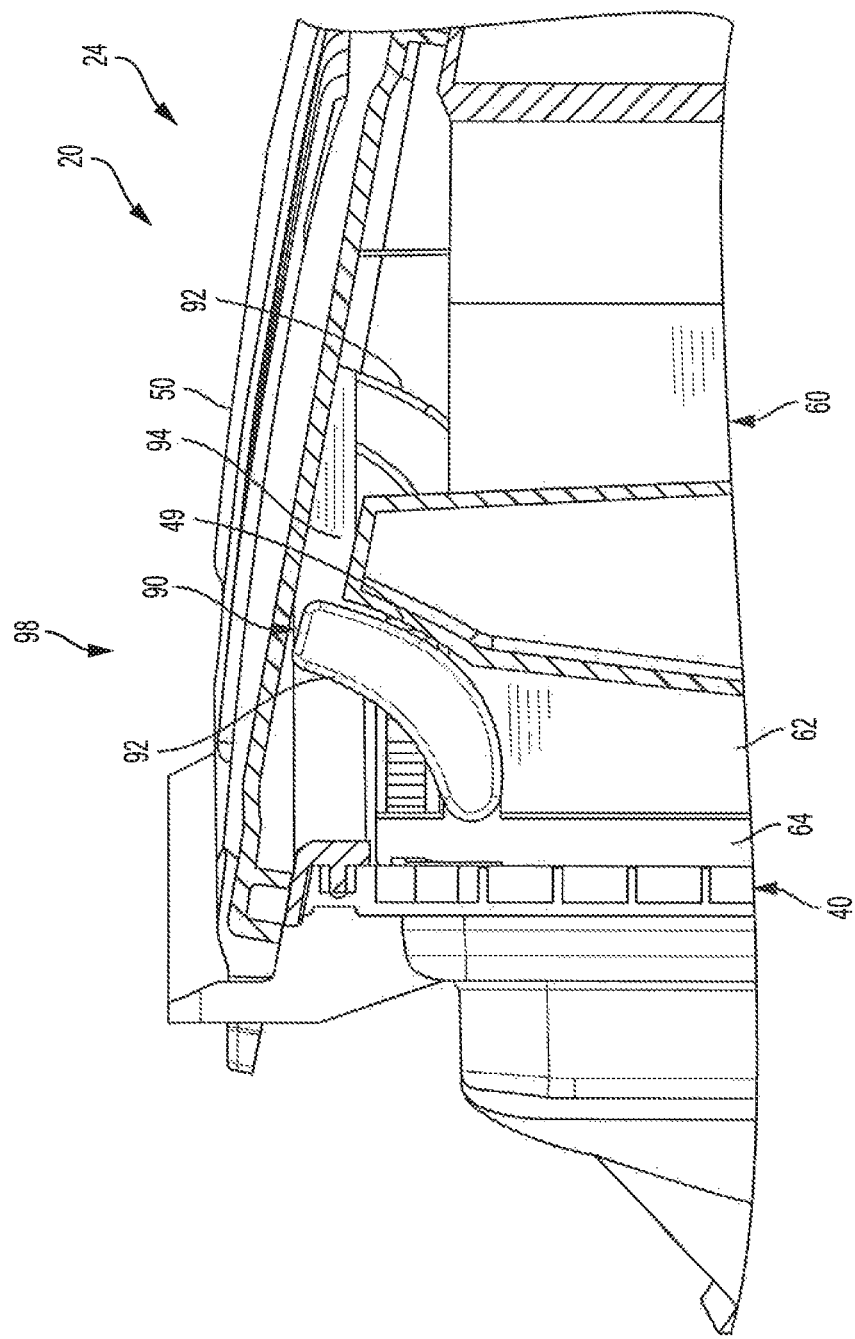
FIGS. 15A-15B are perspective views of a filter element according to yet another embodiment.
FIGS. 15C-15D are cross-sectional side views of the filter element of FIG. 15A, and FIGS. 15E-15F are perspective views of a filter assembly with the filter element of FIG. 15A.

According to another embodiment as shown in FIGS. 15A-15F, the filter element 60 of the filter assembly 20 may include a cam feature or unit 90. The cam unit 90 may be attached directly or indirectly (and temporarily or permanently) to a filter element body of the filter element 60 through, for example, a hinge. The filter element body may include, for example, the frame 64 and/or the filter media 62. According to one embodiment, the cam unit 90 may be movably or pivotally attached or connected to a portion of the frame 64 of the filter element 60. The cam unit 90 may be moveable relative to the housing 40 and the filter element 60 between a disengaged position 96 and an engaged position 98 in order to create a seal between the filter element 60 and the housing 40, as described further herein. As shown in FIGS. 15A-15B, the cam unit 90 may optionally pivot or rotate a particular number of degrees with respect to the frame 64.

Figure 15F:
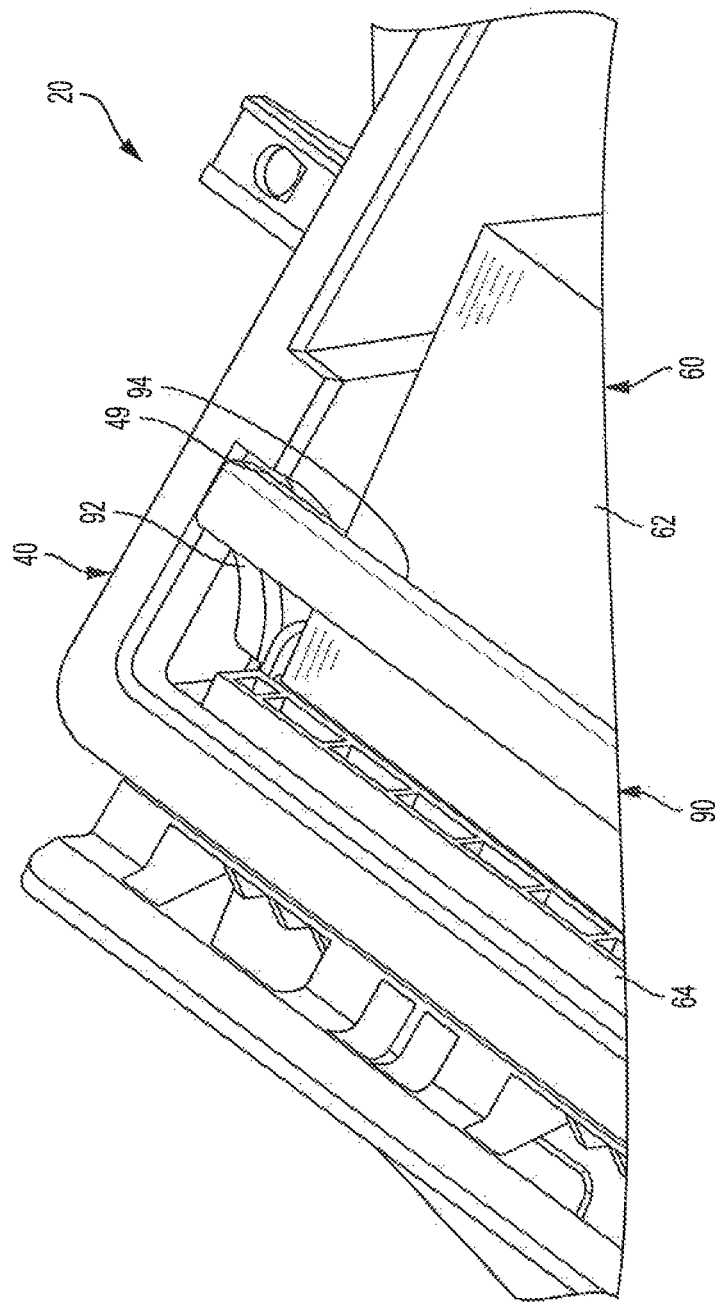

The cam unit 90 may be shaped and size to fit at least partially around a portion of the filter element 60. For example, the cam unit 90 extends between two opposite sides of the filter element 60. The cam unit 90 may have at least one protrusion, extension, or projection 92 attached to the filter element 60. For example, as shown in FIGS. 15A-15B, the cam unit 90 may include two projections 92 that are connected by an extended portion 94. The extended portion 94 may extend (parallel to the x-axis) along a side or the width of the filter element 60, such as the top, and the projections 92 may extend along a portion of the two opposite sides of the filter element 60, as shown in FIGS. 15A-15B. The projections 92 may be shaped and sized similar to the projection 52 and function similarly to the projection 52. As shown in FIG. 15A, the projections 92 may be curved along either side to rotate into a portion of the housing 40, as shown in FIGS. 15E and 15F.

After the filter element 60 has been placed in the housing 40 and before the filter element 60 is sealed to the housing 40 (e.g. in the open position 22), the cam unit 90 may extend out of the housing 40 in the disengaged position 96, as shown in FIG. 15C. In order to actuate and seal the filter element 60 to the housing 40, the cam unit 90 may be moved toward the housing 40 into the engaged position 98, which may move, pivot, or rotate the filter element 60 within the housing 60, as shown in FIGS. 15D and 15E. The cam unit 90 may press against a portion of the housing 40 (such as the pocket 49) to seal the filter element 60 to the frame 40 and wedge between a portion of the housing 40 (such as the pocket 49) and the filter element 60 (such as the frame 64).

In order to further seal the filter element 60 to the housing 40, the cover 50 may be added and closed onto cam unit 90 to prevent the cam unit 90 from retracting or backing out, as shown in FIG. 15D. The cam unit 90 may be sandwiched between the cover 50 and the filter element 60 in the engaged position 98.

The cam unit 90 may further interact with a portion of the housing 40 to further secure or seal the filter element 60. For example, the cam unit 90 may include a snap or interlocking mechanism to mate with a portion of the housing 40.

It is understood that the various components, configurations, and features of the different embodiments of the filter assembly 20 may be combined according to the desired use and configuration.

The term "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A filter assembly, comprising:
a housing;
a cover movably connected to the housing and movable between an open position and a closed position;
at least one projection extending from the cover towards an interior of the housing; and
a filter element that fits at least partially within the housing,
the at least one projection interfacing with the filter element and causing the filter element to pivot within the housing when the cover is moved from the open position to the closed position such that the at least one projection seals the filter element and the housing together when the cover is in the closed position.

2. The filter assembly of claim 1, wherein the filter element includes a frame portion, and wherein the at least one projection directly abuts the frame portion when the cover moves from the open position to the closed position.

3. The filter assembly of claim 1, wherein at least one of the filter element and the housing includes a seal.

4. The filter assembly of claim 3, wherein the filter element includes filter media, and wherein the seal is directly attached to filter media.

5. The filter assembly of claim 3, wherein the filter element includes a frame portion, and wherein the seal attached is to the frame portion.

6. The filter assembly of claim 3, wherein the seal is a radial seal that encompasses a circumference of the filter element.

7. The filter assembly of claim 1, wherein the at least one projection is integral with the cover.

8. The filter assembly of claim 1, wherein the at least one projection comprises at least one curved side, and wherein the curved side is configured to abut a portion of the housing when the cover is in the closed position.

9. The filter assembly of claim 1, wherein the housing includes a curved slot, and wherein the projection extends into the curved slot when the cover is in the closed position such that the projection is wedged between the slot and the filter element.

10. The filter assembly of claim 1, wherein the housing includes a ramped surface therein, the ramped surface configured and positioned to guide the filter element to proper alignment within the housing before the cover is moved from the open position to the closed position.

11. The filter assembly of claim 10, wherein a bottom edge of the filter element is guided along the ramped surface.

12. The filter assembly of claim 10, wherein the ramped surface includes a stair-step configuration.

13. The filter assembly of claim 1, wherein the cover is pivotably attached to the housing.

14. The filter assembly of claim 13, wherein the cover pivots about a first pivot axis and the filter element pivots about a second pivot axis within the housing when the cover is moved from the open position to the closed position, and wherein the first pivot axis is substantially parallel with the second pivot axis.

15. The filter assembly of claim 1, wherein the housing has an opening, wherein the filter element is movable through the opening into the housing when the cover is in the open position, and wherein the cover is configured to close off the opening when the cover is in the closed position.

16. The filter assembly of claim 1, wherein the projection maintains a pressure on the filter element and maintains the position of the filter element when the cover is in the closed position.

17. A filter assembly, comprising:
a housing;
a filter element that fits at least partially within the housing; and
a wedge unit movable relative to the housing and the filter element between a disengaged position and an engaged position, the wedge unit including at least one projection extending toward an interior of the housing, the at least one projection interfacing with the filter element and the housing and causing the filter element to pivot within the housing when the wedge unit is moved from the disengaged position to the engaged position, such that the at least one projection seals the filter element and the housing together when the wedge unit is in the engaged position,
the at least one projection is engaged with and wedged between a portion of the housing and the filter element in the engaged position,
the at least one projection is disengaged from the portion of the housing and the filter element in the disengaged position.

18. The filter assembly of claim 17, wherein the wedge unit extends between two opposite sides of the filter element.

19. The filter assembly of claim 17, further comprising a cover that is movable between an open position and a closed position, wherein the wedge unit is in the engaged position when the cover is in the closed position.

20. A filter assembly, comprising:
a housing; and
a filter element that fits at least partially within the housing and includes a filter element body and a cam unit, the cam unit movably attached to the filter element body and movable between a disengaged position and an engaged position when the filter element is positioned within the housing, the cam unit including at least one projection extending toward an interior of the housing,
the at least one projection interfacing with the housing and causing the filter element body to pivot within the housing when the cam unit is rotated from the disengaged position to the engaged position, such that the at least one projection seals the filter element and the housing together when the cam unit is in the engaged position.

21. The filter assembly of claim 20, further comprising a cover that is movable between an open position and a closed position, wherein the cam unit is in the engaged position when the cover is in the closed position.

22. A filter element, comprising:
a filter element body; and
a cam unit movably attached to the filter element body and movable between a disengaged position and an engaged position when the filter element is positioned within a housing, the cam unit including at least one projection, the at least one projection interfacing with the housing and causing the filter element body to pivot within the housing when the filter element is positioned within the housing and the cam unit is rotated from the disengaged position to the engaged position, such that the at least one projection seals the filter element and the housing together when the cam unit is in the engaged position.

23. The filter element of claim 22, wherein the cam unit extends between two opposite sides of the filter element body.

24. The filter element of claim 22, wherein the filter element body includes a frame portion, and wherein the cam unit is pivotally attached to the frame portion.

25. A method of sealing a filter, comprising:
inserting a filter element into a housing;
aligning an edge of the filter element with an edge of the housing; and
closing a cover on the housing, thereby causing the filter element to pivot within and seal with the housing,
wherein closing the cover on the housing moves at least one projection into the housing, engages the at least one projection with a portion of the filter element, and pushes the filter element with the at least one projection, and wherein the at least one projection extends from the cover.

26. The method of claim 25, further comprising guiding the filter element along a ramped surface within the housing to align the filter element and the housing.

27. The method of claim 25, wherein the filter element is inserted through an opening in the housing and the opening is covered by the cover when the cover is closed.

* * * * *